United States Patent [19]

Rypstat

[11] 4,120,075
[45] Oct. 17, 1978

[54] HUMANE SACRIFICER

[76] Inventor: William B. Rypstat, 909 Ethel St., Wausau, Wis. 54401

[21] Appl. No.: 828,387

[22] Filed: Aug. 29, 1977

[51] Int. Cl.² .............................................. A22B 3/00
[52] U.S. Cl. ......................................... 17/1 R; 17/12
[58] Field of Search ................... 17/12; 83/588, 466.1, 83/824

[56] References Cited

U.S. PATENT DOCUMENTS

| | | | |
|---|---|---|---|
| 850,727 | 4/1907 | Booze | 83/588 X |
| 890,300 | 6/1908 | Reinhold | 83/588 X |
| 1,474,711 | 11/1923 | Haas | 17/12 |
| 2,417,890 | 3/1947 | Staufenbiel | 17/12 |
| 2,787,807 | 4/1957 | Anderson et al. | 17/12 |
| 3,203,036 | 8/1965 | Allison | 17/12 |

Primary Examiner—Willie G. Abercrombie
Attorney, Agent, or Firm—Quarles & Brady

[57] ABSTRACT

A humane sacrificer for animals includes a housing for receiving the head and neck region of an animal, a blade positioned for downward movement associated with said housing, a viewing opening through a wall in said housing so that an operator can see from outside the housing if the animal is properly positioned under the blade and means for guiding the blade so that it can be quickly and forceably moved downward to strike and kill the animal. In one embodiment, the blade is dull and kills the animal in a bloodless manner and in a second embodiment the blade is sharp and decapitates the animal.

4 Claims, 4 Drawing Figures

HUMANE SACRIFICER

BACKGROUND OF THE INVENTION

In the course of conducting laboratory experiments with animals it often becomes necessary for the researcher to sacrifice the animal to evaluate the results of the experiments. Although experimental animals may be sacrificed by gassing or poisoning, such means are often not acceptable because the presence of the gas or the poison in the blood, the tissues or the organs of the animals may interfere with the analytical tests which must be performed. Heretofor, in such instances it has been necessary for the laboratory worker to kill the animal by breaking its neck or by slitting its throat. Understandably, some laboratory workers are psychologically intimidated at the prospect of sacrificing laboratory animals in such a manner. Whereas, others lack the strength or skill to quickly and humanely kill the animal in such a manner. Therefore, a need exists for an improved humane method of sacrificing animals.

SUMMARY OF THE INVENTION

It is the general object of the present invention to disclose a device for killing an animal which makes it possible for even an unskilled person to humanely and quickly kill the animal.

It is also an object of the invention to disclose a method of humanely and quickly killing an animal without using gases or poisons that can interfere with necessary analytical tests.

It is a further object of the invention to disclose a device for humanely sacrificing animals which device is not only compact, but which also is readily sterilizable.

It is still a further object to disclose a first embodiment of the device in which an animal can be swiftly and humanely killed in a bloodless manner and a second embodiment in which an animal may be swiftly and humanely decapitated.

These and still other objects may be obtained by use of the sacrificer of the present invention which includes a housing adapted to receive and substantially immobilize the head and neck regions of the animal to be sacrificed, a blade positioned for downward movement associated with the housing, means for determining from outside the housing if the neck of the animal is properly positioned under the blade and means for guiding the blade as it is moved quickly and forceably downward to strike and fracture the neck of the animal thereby killing the animal.

It is a further object of the invention to disclose a device for sacrificing animals which minimizes the chances that the laboratory workers sacrificing the animals will be psychologically disturbed or physically injured.

The foregoing and still further objects are obtained by the practice of the present invention which will be described hereafter in connection with the drawings which follow.

DESCRIPTION OF THE PREFERRED EMBODIMENTS

Figure 1:
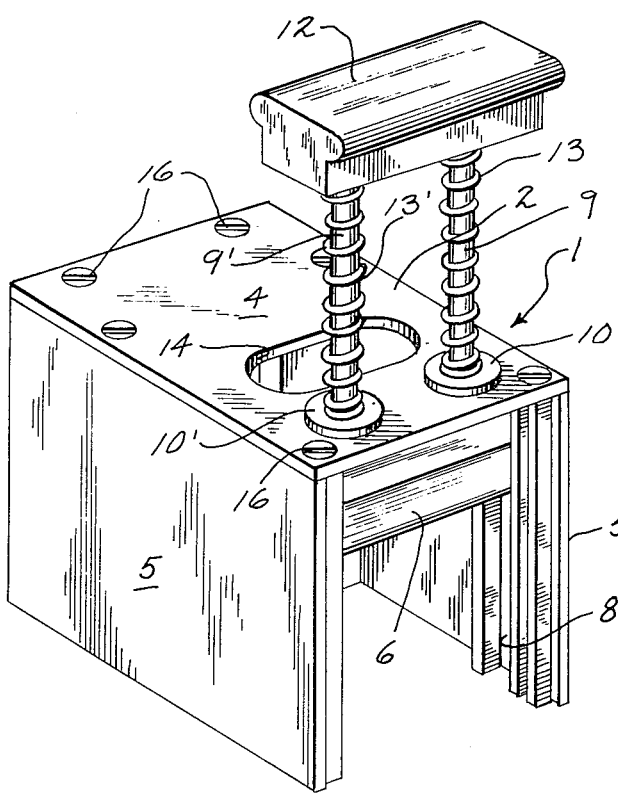
FIG. 1 is a perspective view of a sacrificer of the present invention.
Figure 2:
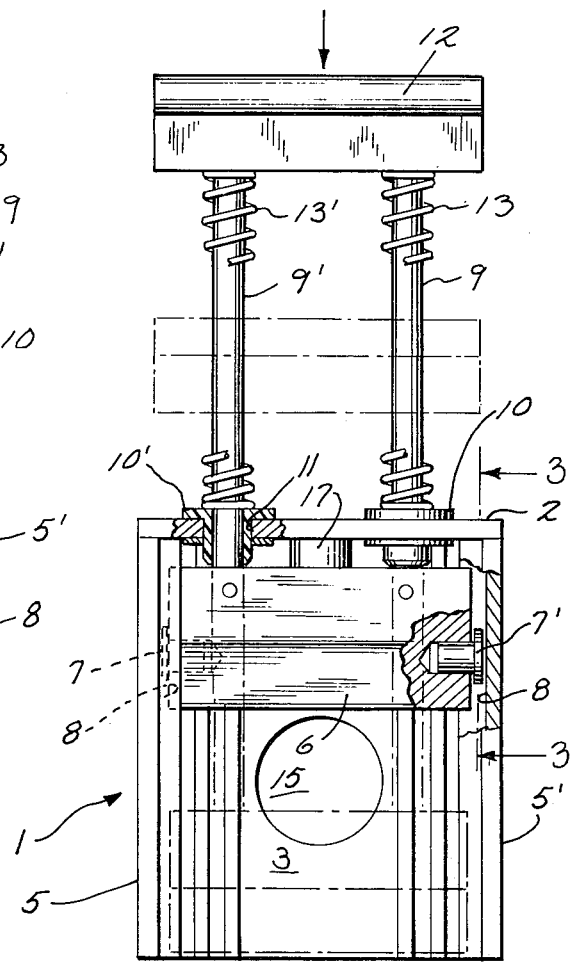
FIG. 2 is a front elevational view, partly in section, of the sacrificer of FIG. 1.
Figure 3:
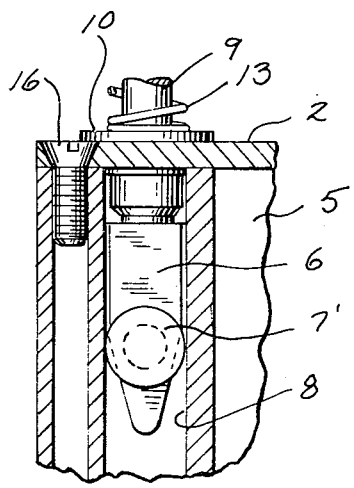
FIG. 3 is an enlarged end view of a dull blade assembly for use in the sacrificer for FIG. 1.

In the drawings, the sacrificer generally indicated by the number 1 is provided with a housing 2 having an end wall 3, a top wall 4, and a pair of side walls 5, 5'. Positioned within the housing 2 is a blade 6 which is adapted for reciprocal vertical movement. The blade 6 is shown in FIG. 1 in a raised position and can be seen in a lowered position in FIG. 2 is broken lines. The blade 6 is guided in vertical movement from a raised to a lowered position by the cooperation of a pair of plastic self-lubricating guide discs 7, 7' located on each side of the blade 6 and a pair of disc receiving channels 8, 8' on the inside of the side walls 5, 5'. As seen best in FIGS. 3 and 4, the discs 7, 7' fit closely within the channels 8, 8' which prevents the blade 6 from wobbling. The movement of the blade 6 is also guided by a pair of push pins 9, 9' which extend from the top of the blade 6 through a pair of self-lubricating plastic bushings 10, 10' positioned in openings 11 in the top wall 4 of the housing 2. The upper ends of the push pins 9, 9' are attached to a handle 12 which is positioned outside and above the housing 2. The push pins 9, 9', the bushings 10, 10' and the discs 7, 7' and channels 8, 8', cooperate to insure the smooth movement of the blade vertically upward and downward.

As seen in the drawings, compression springs 13, 13' are positioned about each of the push pins 9, 9' between the topside of the bushings 10, 10'; and the underside of the handle 12. When no downward force is exerted on the handle 12 the compression springs 13, 13' maintain the handle 12, and, of course, the blade 6 in the raised position seen in FIG. 1. However, when a force which can compress the springs 13, 13' is exerted on the handle 12 the blade 6 is moved vertically downwardly to the position seen in FIG. 2 in broken lines. The downward movement of the blade 6 is stopped by the tightly coiled fully compressed springs 13, 13' and the surface upon which the housing rests. Once the downward force is removed the springs 13, 13' return the blade 6 to the raised position seen in FIGS. 1 and 2. In order to protect the bushings 10, 10' from being deformed by the top of the blade 6 a stop 17 is provided which limits the upward movement of the blade 6.

Turning to FIG. 1, it can be seen that the top wall 4 of the housing is provided with a viewing opening 14. The opening 14 permits the operator of the device to look into the interior of the housing 2 to ascertain if the animal is properly positioned beneath the blade 6.

As can be seen only in FIG. 2, the end wall 3 of the housing 2 is provided with an opening 15. The opening 15 permits an animal positioned within the housing 2 to see to the outside. It has been found that when the animal can see to the outside, it is much more likely to remain calm and not try to escape from the housing.

As seen in the drawings, the housing 2 is comprised of flat wall pieces, preferably of extruded aluminum, which are joined together by threaded fasteners 16.

In those procedures in which it is desired to only kill the animal and not decapitate it, a dull blade is preferred. A blow of sufficient force which is struck with the dull blade crushes the spinal cord and terminates the brain stem killing the animal instantly. A suitable dull blade structure is shown in cross section in FIG. 3.

Figure 4:
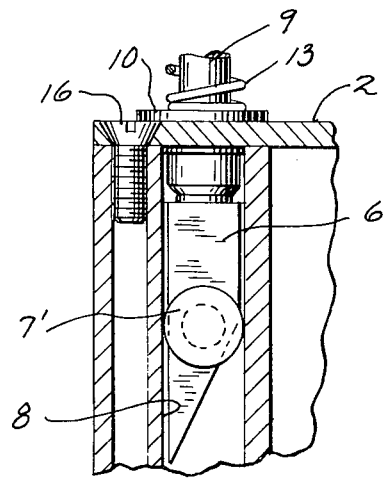
FIG. 4 is an enlarged end view of the sharp blade assembly for use in the sacrificer of FIG. 1.

When it is desired to both kill and decapitate the animal a sharp blade such as that shown in cross section in FIG. 4 may be employed. The sharp blade is preferably provided with a suitable guard (not shown) to prevent cutting the operator or prematurely cutting the animal. When employing the sharp blade is may be helpful to use a bottom plate (not shown) that has a blade receiving recess so that the skin of the animal is completely severed.

Experience in the development of the sacrificer suggests that the preferred method of using the sacrificer is as follows:

(1) Spread paper on the work surface upon which the sacrificer will be placed as it is common for animals sacrificed by any method to lose bowel and bladder control.

(2) Hold the sacrificer with your dominant hand with the blade in the fully raised position.

(3) Hold the animal with your other hand firmly behind the animals shoulders.

(4) Place the animal on the work surface.

(5) Place the sacrificer slowly over the animal until the blade is positioned directly above the cervical region of the animal.

(6) Look through the viewing opening in the top of the sacrificer to assure that the animal is correctly positioned.

(7) Deliver a quick, sharp blow to the blade handle with the heel of the hand.

(8) Remove the sacrificed animal from the sacrificer and begin the experimental procedure.

Prior to using the sacrificer it may be helpful to practice the method on sick or injured animals not involved in the experiment.

As a result of practical experiment with the sacrificer it has been found helpful to place the housing down slowly over the animal being careful not to pinch its paws. If the housing is placed down slowly the animal will move its paws within the housing. If the animal is aggressive and trying to bite it can be disorientated by grabbing it by the tail near the base and circling the animal 8 or 10 times. While the animal is still disorientated the housing can be placed over its head and the animal quickly sacrificed. Most animals will stay calm within the housing because they can see out through the opening 15 in the end wall of the housing.

It is helpful when sacrificing mice to place the mouse on a cloth, then press its back and gently pull its tail. When this is done, the mouse digs into the cloth with its claws and the housing then can be placed over its head and the animal quickly sacrificed. Another helpful technique is to place the sacrificer in the animals cage and put the animals food within the housing. Then on the day of sacrifice the food can be put in the housing and the animal will be perfectly calm within the sacrificer.

The sacrificer of the present invention can be used with equal effectiveness on mice, rats, frogs, guinea pigs, hamsters, chickens, rabbits, cats, and other animals. Obviously, the size of the sacrificer may be different for relatively small and relatively large animals. However, the housing should be sized to receive and preferably immobilize the head and neck region of the animal upon which the sacrificer is to be used. Normally, for smaller experimental animals the housing will be about 3 inches wide, 4 inches high and 6 inches long.

The components of the sacrificer are preferably all made of materials which can be readily autoclaved or otherwise sterilized. For example, aluminum is the preferred material for the housing walls, the bottom plate, the dull blade, the push pins and handle. The springs are preferably of steel, and the sharp blade is of surgical steel or a similar material that can be sharpened when needed with a common sharpening stone. The guide discs and the bushings are of a self-lubricating material such as nylon, rigid polyethylene or teflon. After cleaning, the guide channels should be lubricated with a silicon spray or similar lubricant.

The method of sacrificing an animal using the sacrificer of the present invention has several distinct advantages over previously known procedures for sacrificing animals. One advantage is that the laboratory worker can without viewing the sacrificing procedure directly, quickly and humanely kill the animal. As a result, it has been found that the reluctance of many laboratory workers to sacrificing animals is greatly reduced. Another advantage is that the animal being sacrificed is normally calm and unexcited. Still another advantage is that when the animal is sacrificed by the use of a dull blade embodiment, the animal's heart continues to beat for as long as five minutes so that blood samples can easily be drawn. In addition, none of the blood is lost or contaminated and the internal organs are not damaged. Furthermore, the sacrificer of the present invention protects the laboratory worker from being injured by bites or scratches from the more vicious species of animals. Other advantages will be apparent to those skilled in the art.

A number of modifications and changes may be made without departing from the spirit or scope of the present invention. For example, if desired, the viewing opening in the top wall of the housing could be eliminated by making at least a part of the top wall transparent so that the operator can see directly through the top wall if the animal is properly positioned. Furthermore, if the animal being sacrificed is not particularly restless the opening in the end wall may be eliminated. In some instances, it may be desirable to modify the blade. For example, if the sacrificer is being used to pith a frog, a narrow blade can be used which has a sharp end so that the frogs head is not crushed or severed, but only the spinal cord is severed. The method can also be varied. For example, when a large number of animals must be sacrificed, or a large species of animal is being sacrificed, the operator may use a mallet to strike the handle or the procedure can be automated.

In view of the foregoing, it is to be understood that the scope of the invention is intended to cover such modifications and that the invention is not to be limited except by the claims which follow hereafter.

I claim:

1. A sacrificer for humanely killing an animal includes a housing for receiving at least the head and neck region of said animal, said housing having an end wall, a top wall, a pair of side walls and a blade adapted for reciprocal movement positioned in the housing at the opposite end from the end wall; said end wall having a viewing area therein so that when the animal is properly orientated in the housing to face the end wall it can see through the viewing area to the outside and said top wall having a viewing area therein so that it can be determined from outside the housing if the animal is properly orientated in the housing so that the animal will be struck a killing blow in the head or neck region by moving the blade forcibly downward.

2. The sacrificer of claim 1 in which the blade is attached to handle means for receiving a force to move the blade forcibly downward.

3. The sacrificer of claim 1 in which the blade has a dull edge so that the animal is killed by dislocating its cervical cord without breaking the intact skin.

4. The sacrificer of claim 1 in which the blade has a sharp edge.

* * * * *